US007325268B1

(12) United States Patent
Curcuri (10) Patent No.: US 7,325,268 B1
(45) Date of Patent: Feb. 5, 2008

(54) WHEEL CLEANER APPARATUS

(76) Inventor: Thomas J. Curcuri, 20714 Morningside Dr., Grosse Pointe Woods, MI (US) 48236

( * ) Notice: Subject to any disclaimer, the term of this patent is extended or adjusted under 35 U.S.C. 154(b) by 684 days.

(21) Appl. No.: 10/893,638

(22) Filed: Jul. 16, 2004

(51) Int. Cl.
*B08B 1/00* (2006.01)
(52) U.S. Cl. .......................... 15/97.1; 15/21.1; 15/88.3
(58) Field of Classification Search ............... 15/21.1, 15/88.1–88.3, 97.1
See application file for complete search history.

(56) References Cited

U.S. PATENT DOCUMENTS

| | | | | |
|---|---|---|---|---|
| 592,730 | A | * | 10/1897 | Green .......................... 15/180 |
| 2,129,019 | A | * | 9/1938 | Mulvihill .................... 15/88.2 |
| 2,470,534 | A | | 5/1949 | Thomas |
| 2,488,376 | A | | 11/1949 | Clauser |
| 2,910,117 | A | | 11/1959 | Lamerson |
| 3,108,299 | A | * | 10/1963 | Baldwin ..................... 15/21.1 |
| 3,461,938 | A | | 8/1969 | Mueller |
| 3,658,152 | A | | 4/1972 | Mueller |
| 3,978,903 | A | | 9/1976 | Mueller et al. |
| 4,061,173 | A | | 12/1977 | Daly |
| 4,183,392 | A | | 1/1980 | Kane |
| 4,420,026 | A | | 12/1983 | Goiseau |
| 4,527,300 | A | * | 7/1985 | Kunde et al. ................ 15/88.2 |
| 4,563,975 | A | | 1/1986 | Kozlowski et al. |
| 4,723,563 | A | | 2/1988 | Kane |
| 4,800,944 | A | | 1/1989 | Kane |
| 4,881,488 | A | | 11/1989 | Fantucci |
| 5,065,694 | A | | 11/1991 | Earnheart, Jr. |
| 5,094,284 | A | | 3/1992 | Curcuri |
| 5,141,040 | A | | 8/1992 | Curcuri |
| 5,170,828 | A | | 12/1992 | Curcuri |
| 5,417,763 | A | | 5/1995 | Diepens |
| 5,728,220 | A | | 3/1998 | Curcuri et al. |
| 5,964,002 | A | * | 10/1999 | Schaal .......................... 15/21.1 |

OTHER PUBLICATIONS

Sample of Polish Cloth of Contec, Inc. of Spartanburg, SC 29304, Part No. LWTR0001 Under Tradename "Thunderbuff"™ Date Believed Sep. 2001.
Sensor Data Sheet of Balluf, Inc. of Florence, KY 41042 for Linear Transducer 180 Model No. BTL5-A/C/E/G-M-B/Z-S32/KA Dated Jul. 2003, 2 pgs.
Wheel Cleaner Apparatus in Current Use. Manufacturer and date of use unknown.

* cited by examiner

*Primary Examiner*—Mark Spisich
(74) *Attorney, Agent, or Firm*—Peter D. Keefe (57) ABSTRACT

An automatic wheel cleaner apparatus providing cleaning of the inner side of a motor vehicle wheel having an inflated tire mounted thereto (a mounted wheel) prior to attachment of adhesively attached balancing weights. The apparatus includes: a main frame, a rollers set composed of driven and non-driven rollers rotatably connected to the main frame for receiving a mounted wheel, a rotation assembly horizontally translatable on the main frame for providing rotation of the mounted wheel, and a cleaner head vertically translatable on the main frame and having a cleaner stocking for cleaning the inner side of the wheel of the mounted wheel during rotation of the mounted wheel.

20 Claims, 12 Drawing Sheets

WHEEL CLEANER APPARATUS

TECHNICAL FIELD

The present invention relates to motor vehicle wheels with inflated tires mounted thereto ("mounted wheels"), and more particularly to balancing weights attached to the inner side (axle hub side) of the wheels. Still more particularly, the present invention relates to a wheel cleaner apparatus for wiping clean the inner side of a wheel prior to the adhesive attachment thereto of balancing weights.

BACKGROUND OF THE INVENTION

When a wheel has mounted thereto an inflated tire (hereinafter referred to simply as a "mounted wheel") there is generally present a non-uniform annular distribution of mass. At cruising speeds of a motor vehicle, a mounted wheel involves the generation of significant centrifugal force. The presence of non-uniform annular distribution of mass of the mounted wheel consequently results in a non-uniform annular distribution of centrifugal force at motor vehicle cruising speed, which situation produces vibration.

In order to eliminate vibration caused by a non-uniform annular distribution of centrifugal force generated when the mounted wheels are rotating at cruising speed, balancing weights, usually composed of lead, are attached to the wheel at the outer side (lug nut side) rim, by means of a clip. Problematically, these balancing weights and their clip are visible and are generally unsightly.

To solve the problem of onlookers seeing unsightly balancing weights, it is desirable to attach balancing weights to the inner side rim portion of the wheel using an adhesive attachment. In this regard, it is necessary for the inner side of the wheel to be clean or else the adhesive can fail. Thus, while adhesively attached balancing weights solve the unsightliness problem, there remains the problem that in high volume production situations, it is not known how to efficiently clean the inner side of the wheel.

Accordingly, what remains needed in the art is to somehow provide automatic cleaning of the inner side of a wheel prior to attachment of adhesively attached balancing weights.

SUMMARY OF THE INVENTION

The present invention is an automatic wheel cleaner apparatus that provides cleaning of the inner side of a wheel prior to attachment of adhesively attached balancing weights.

The wheel cleaner apparatus according to the present invention includes: a main frame, a rollers set composed of driven and non-driven rollers rotatably connected to the main frame for receiving a mounted wheel from a preceding station (as for example a tire mounting and inflation station), a rotation assembly mounted to the main frame for horizontal translation which provides selective rotation of the mounted wheel, and a cleaner head mounted to the main frame for vertical translation which provides cleaning of the inner side of the wheel of the mounted wheel.

In operation, the driven rollers are (rotationally) activated to receive a mounted wheel, wherein the wheel thereof lies such that the inner side faces the rollers. The driven rollers are then (rotationally) deactivated to position the mounted wheel over the cleaner head, wherein the rollers set provides a horizontal work table for supporting the mounted wheel during the cleaning operation. The cleaner head then translates vertically upward from a stored position to a deployed position so as to be positioned contact free of the wheel within the circumference of the inner side thereof. Next, the rotation assembly horizontally translates toward the tire of the mounted wheel from a stored position to a deployed position, where during the rotator contacts the tire tread and then pushes the mounted wheel toward the cleaner head until the cleaner head touches the inner side of the wheel. The driven rollers are again activated while simultaneously a toothed rotator of the rotation assembly commences rotation while in engagement with the tire tread, whereupon the mounted wheel commences to rotate. During the rotation (as for example a little over one revolution), the cleaner head, which has a covering of a cleaner stocking, contactingly cleans the inner side surface of the wheel as it rotates with the wheel whereat adhesively applied balancing weights will be subsequently placed. Next, the rotation of the driven rollers and the rotator are stopped, the cleaner head is vertically translated back to its stored position and the rotation assembly is horizontally translated back to its stored position. The driven rollers are then activated again to effect exiting of the (now cleaned) mounted wheel out of the wheel cleaner apparatus for further operations (ie., wheel balancing, including the attachment of the adhesively attached balancing weights to the cleaned inner side wheel surface).

Accordingly, it is an object of the present invention to provide an automatic apparatus for providing cleaning of the inner side surface of a wheel of a mounted wheel prior to attachment to the cleaned surface of adhesively attached balancing weights.

This and additional objects, features and advantages of the present invention will become clearer from the following specification of a preferred embodiment.

BRIEF DESCRIPTION OF THE DRAWINGS

FIGS. 7A and 7B show a cleaner stocking for covering a cleaner head body of the cleaner head of FIG. 6, wherein

DESCRIPTION OF THE PREFERRED EMBODIMENT

Referring now to the Drawing, FIGS. 1 through 12 depict various aspects of a wheel cleaner apparatus 100 according to the present invention.

Figure 1:
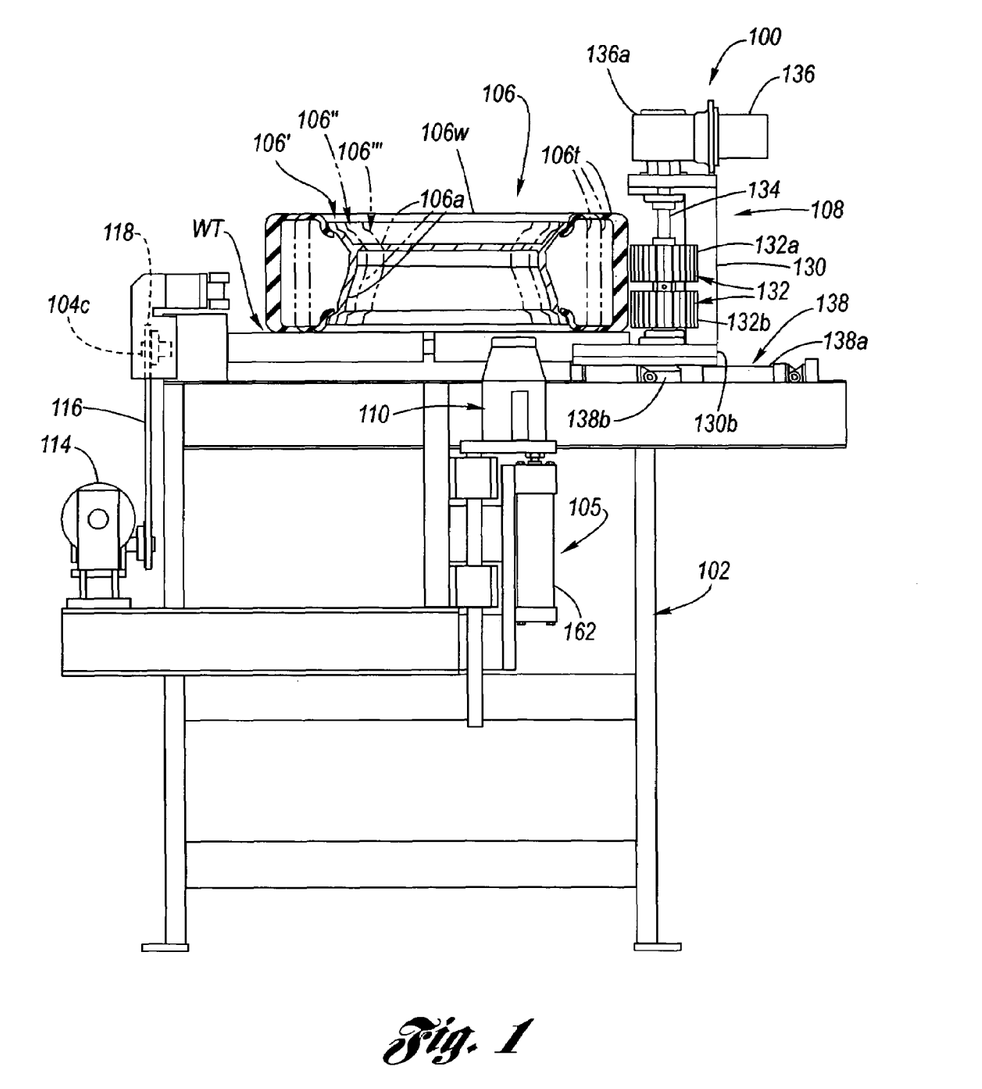
FIG. 1 is a side elevational view of the wheel cleaner apparatus according to the present invention.
Figure 2:
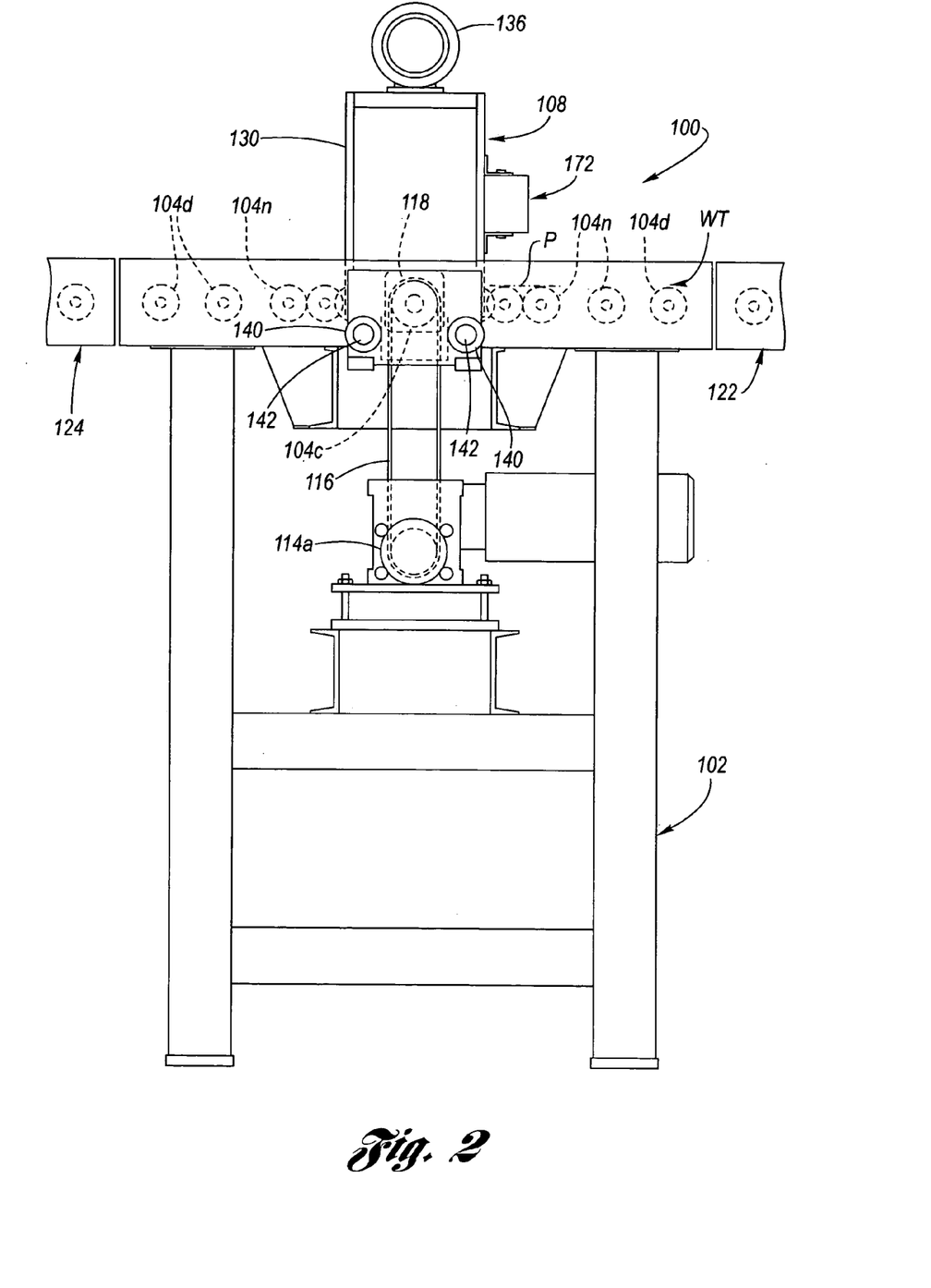
FIG. 2 is an end view of the wheel cleaner apparatus of FIG. 1.
Figure 3:
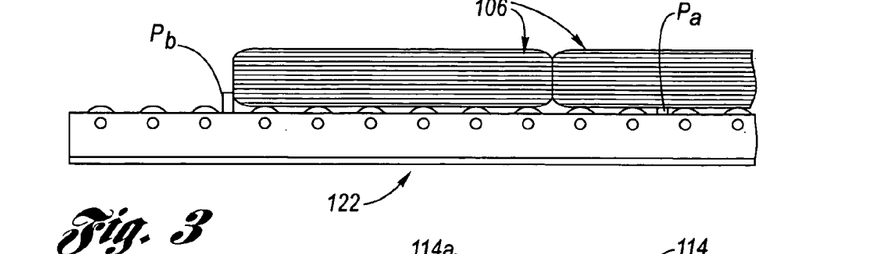
FIG. 3 is an example of a supply-side conveyance, partly shown at FIG. 2, for supplying singulated mounted wheels to the wheel cleaner apparatus according to the present invention.

As can be seen from FIGS. 1 and 2, the wheel cleaner apparatus 100 includes a main frame 102; a rollers set 104 rotatably mounted horizontally on the main frame for receiving a mounted wheel 106 (by "mounted wheel" is meant a wheel 106w having mounted thereto an inflated tire 106t) from a preceding station (as for example a tire mounting and inflation station); a rotation assembly 108 mounted to the main frame for horizontal translation, the rotation assembly providing selective rotation of the mounted wheel; and a cleaner head assembly 105 mounted to the main frame, wherein a cleaner head 110 thereof provides cleaning of the inner side 106a of the wheel 106w of the mounted wheel 106.

As can be appreciated from FIG. 1, the wheel cleaner apparatus 100 has ability to accommodate various size mounted wheels 106. For example a mounted wheel 106' having a twenty inch wheel, a mounted wheel 106" having an eighteen inch wheel, and a mounted wheel 106" having a fifteen inch wheel. Aspects of accommodation of differing wheel sizes will be discussed hereinbelow.

Figure 4:
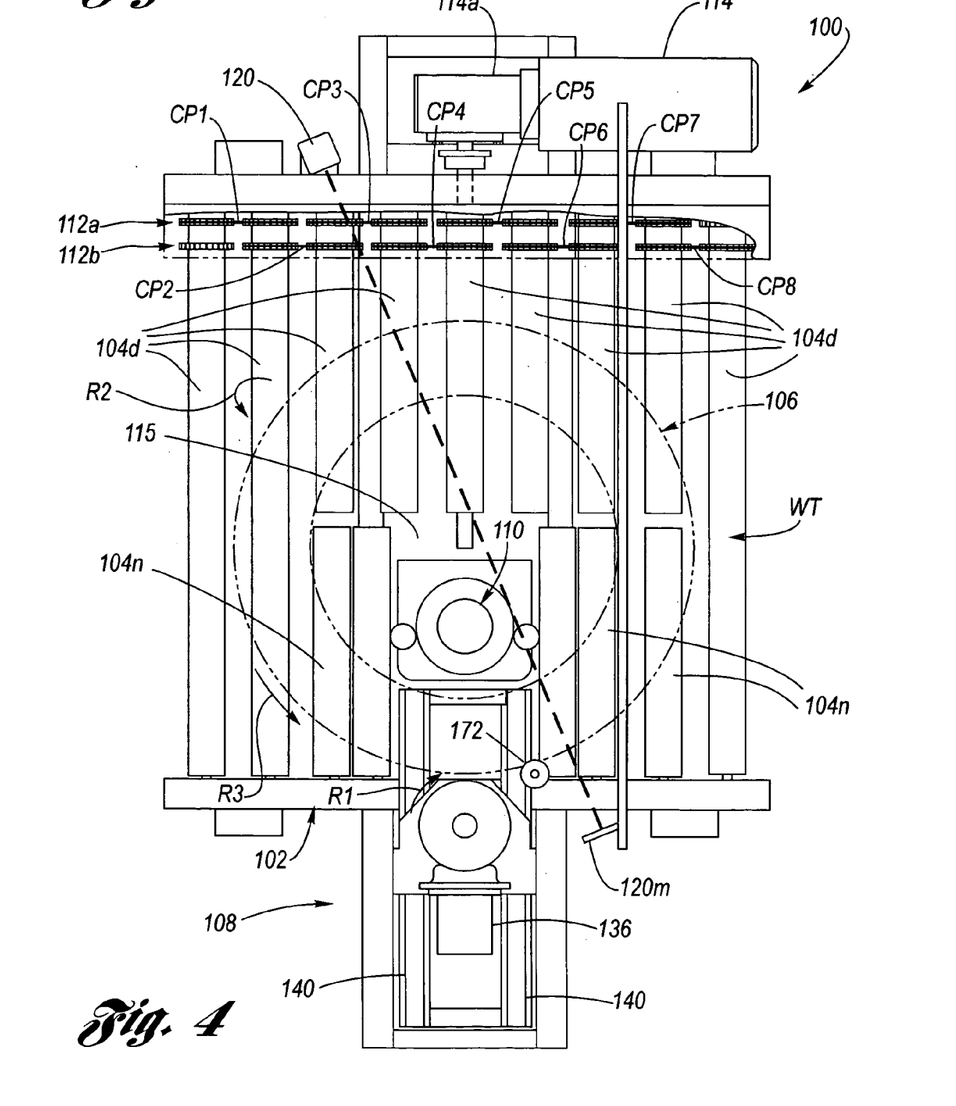
FIG. 4 is a top plan view of the wheel cleaner apparatus of FIG. 1.

As seen best by FIGS. 1, 2 and 4, the rollers set 104 comprises a plurality of driven rollers 104d and non-driven rollers 104n. Each roller of the rollers set 104 is rotatably mounted to the main frame 102 via bearings. An opening 115 in the rollers set 104 provides a space through which the cleaner head 110 vertically translates above and below a plane P (see FIG. 2) defined by a mounted wheel work table WT of the rollers set 104.

The driven rollers 104d each have at one end thereof a pair of sprockets 112a, 112b. In this regard, the driven rollers 104d are mutually driven by alternatingly adjacent sprockets 112a, 112b being chained in pairs CP1, CP2, CP3, CP4, CP5, CP6, CP7 and CP8, as show most clearly at FIG. 4. An electric driven rollers motor 114 is mounted to the main frame 102 and drives, via a gear box 114a, the driven rollers 104d by a chain 116 which engages a drive sprocket 118 connected to a center roller 104c, as best seen at FIGS. 1 and 2. The rollers set 104 provides a work table WT upon which mounted wheels are received, cleaned and then exited.

An electric eye sensor 120, with an opposing mirror 120m, is mounted to the main frame 102 which is positioned relative to the work table WT such as to provide sensory data for deactivating the rollers drive motor 114 via electronic control to be described hereinbelow.

With respect to receiving mounted wheels 106, FIG. 2 depicts a supply-side conveyance 122 for supplying singulated (individual, one at a time) mounted wheels to the rollers set 104, which will be discussed further hereinbelow. With respect to advancing mounted wheels 106, FIG. 2 further depicts a delivery-side conveyance 124 for carrying away the exited singulated mounted wheels to a subsequent station, as for example mounted wheel balancing and adhesively attaching adhesively attached balancing weights thereto.

The rotation assembly 108 includes a rotation assembly frame 130. A rotator 132 is preferably in the form of a pair of toothed rotator wheels 132a, 132b. The rotator 132 is affixed to a rotator shaft 134 which is rotatably mounted to the rotation assembly frame in a vertical orientation (perpendicular to the plane of the work table WT). Connected to the rotation assembly frame 130 is a (preferably electric) rotator drive motor 136 which rotates the rotator 132 via a gear box 136a connection to the rotator shaft 134.

Figure 8A:
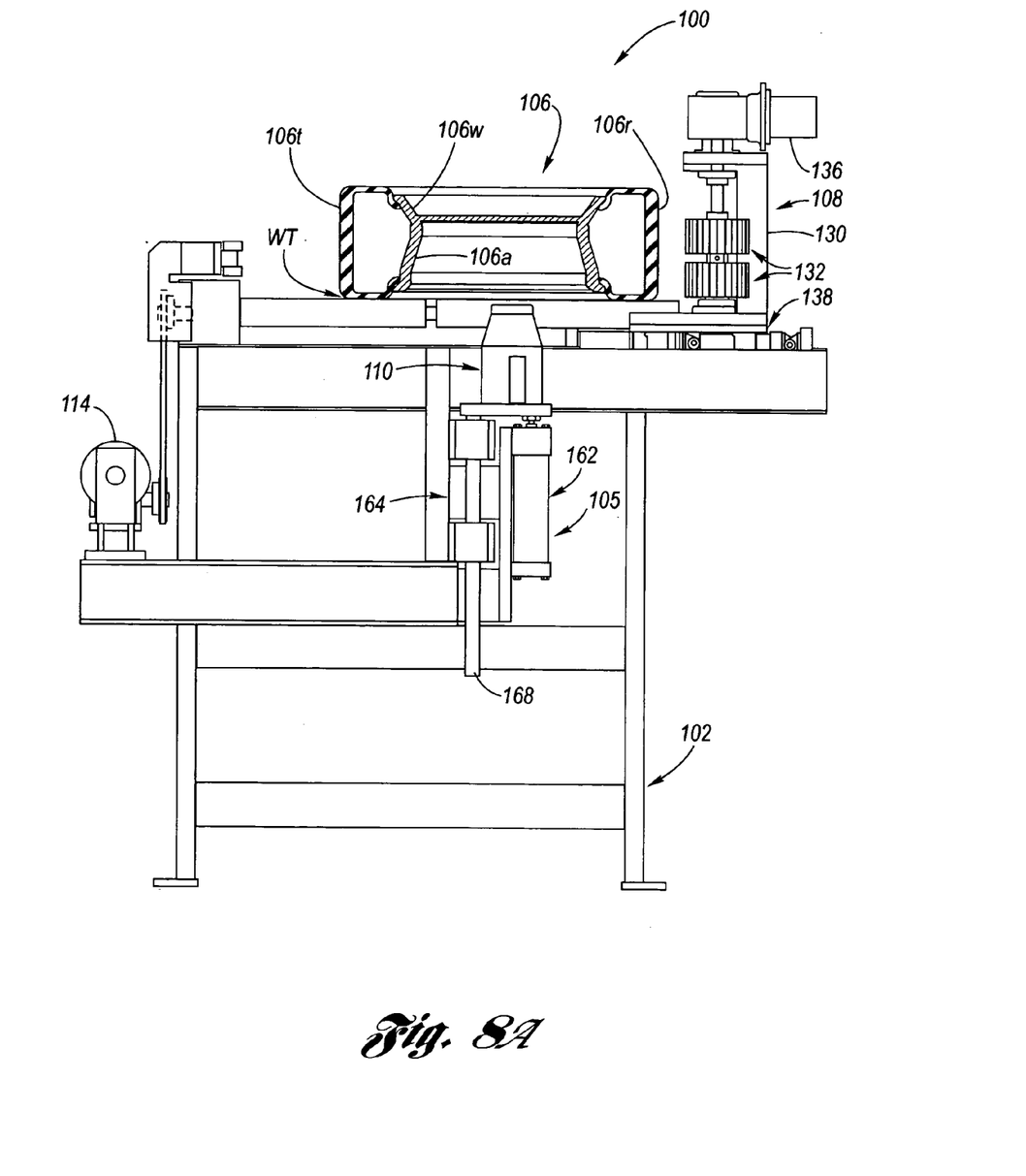
FIGS. 8A through 8C are side views of the wheel cleaner apparatus of FIG. 1, showing sequential operational steps in operation of the wheel cleaner apparatus with respect to a mounted wheel.
Figure 8B:
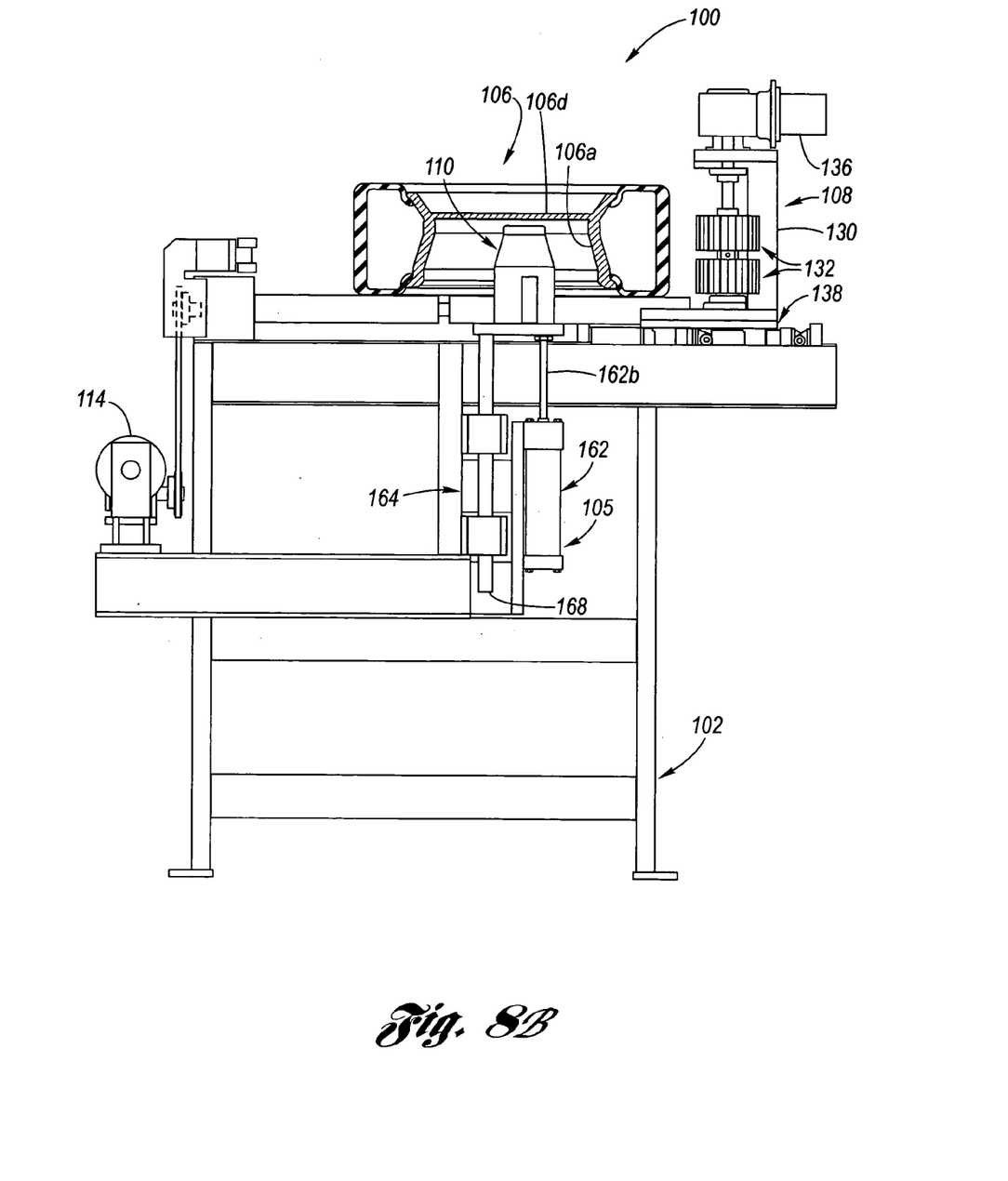
Figure 8C:
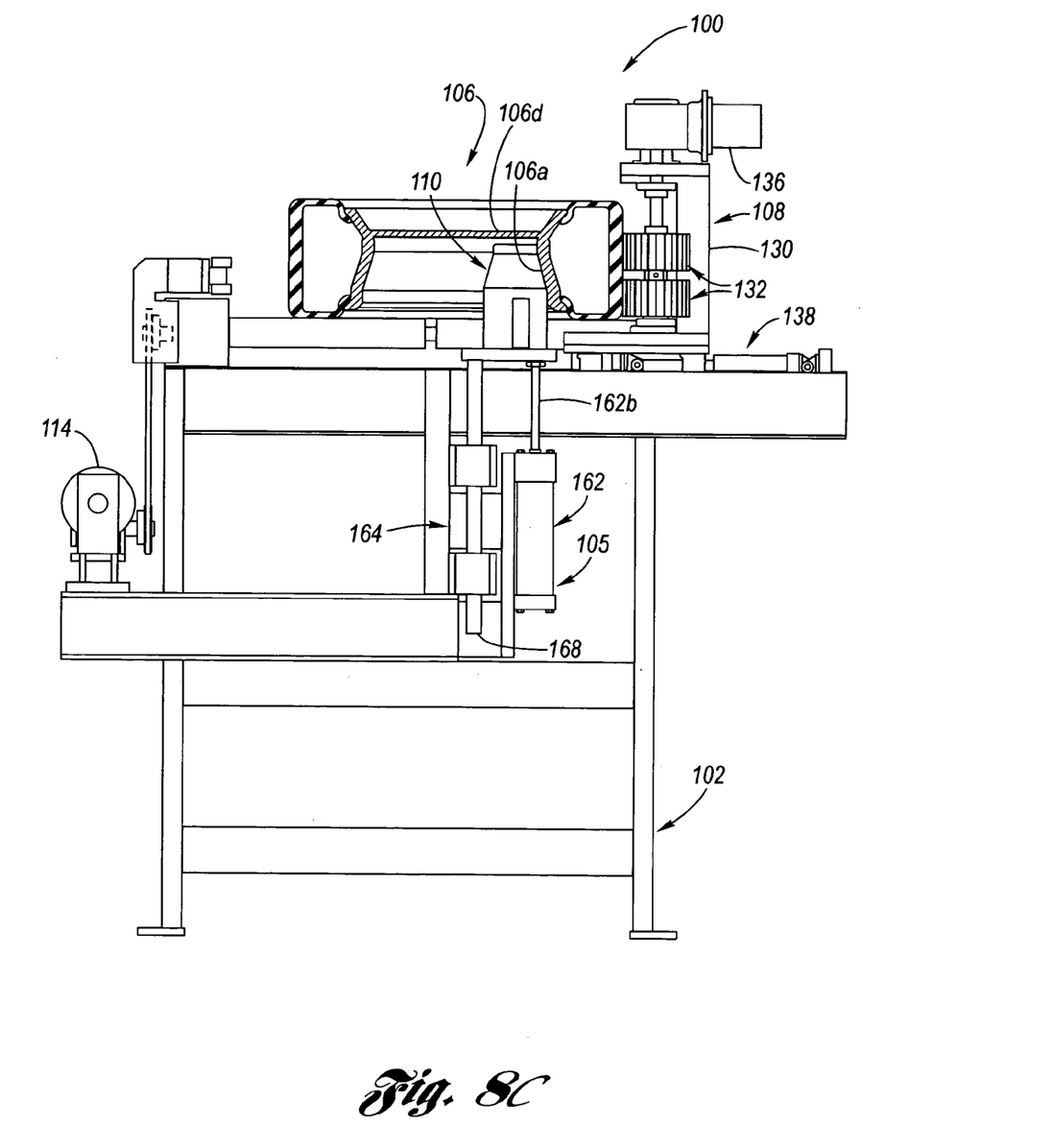

The rotation assembly 108 is mounted to the main frame 102 so that it is able to translate horizontally (in the plane of the work table WT) from a stored position (as for example shown at FIG. 8A) to a deployed position (as for example shown at FIG. 8C). In order to provide the horizontal translation, a (preferably pneumatic) rotation assembly actuator 138 has a cylinder 138a pivotally connected to the main frame 102 and a shaft 138b pivotally connected to a base 130b of the rotation assembly frame 130. The base 130b is connected to bushings 140 which slidably receive, respectively, guide tubes 142 mounted to the main frame 102 in a horizontal orientation (parallel to the plane of the work table WT), wherein one guide tube is located on either side of the rotation assembly actuator 138. Operation of the rotation assembly actuator is electronically controlled, as will be detailed hereinbelow.

Referring now additionally to FIGS. 5A through 7B. The cleaner head assembly 105 will now be detailed.

The cleaner head 110 includes a cleaner head body 150 covered by a cleaner stocking 152. The cleaner head body 150 is preferably composed of a plastic material and has a generally cone shape composed of a cylindrically shaped lower portion 150a, a frustoconically shaped middle portion 150b and a reduced diameter cylindrically shaped upper portion 150c (see FIG. 6). The shape of the cleaner head 110 is intended to generally form fit to the inner side shape of a wheel, and may be differently shaped to suit a particular shape of the inner side of a particular wheel or wheels.

Figure 6:
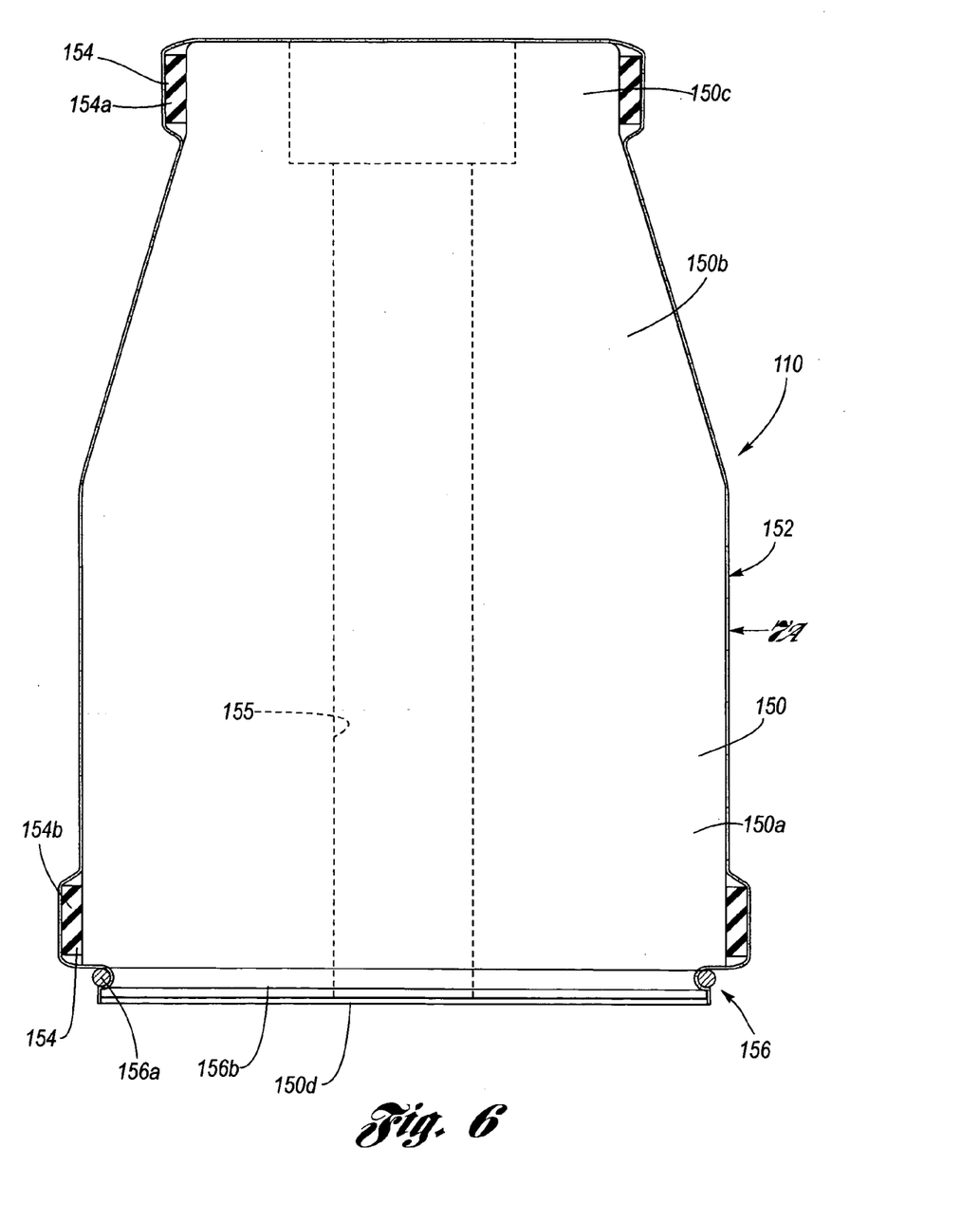
FIG. 6 is a detail, partly sectional side view of the cleaner head of the wheel cleaner apparatus of FIG. 1.
Figure 7A:
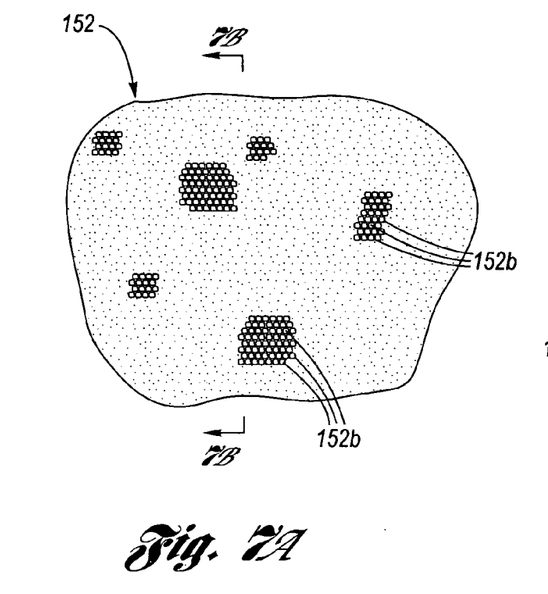
FIG. 7A is a plan view seen along arrow 7A of FIG. 6.
Figure 7B:
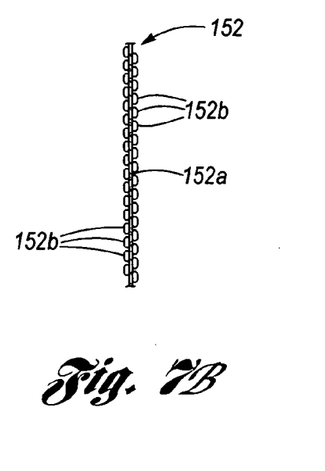
FIG. 7B is a sectional view seen along lines 7B-7B of FIG. 7A.

As can best be seen at FIGS. 6 through 7B, at least one elastomeric band 154 is provided which encircles the cleaner head body 150. While the at least one elastomeric band 154 could encompass the entire surface of the lower middle and upper portions 150a, 150b, 150c, it is preferred to provide two elastomeric bands: an upper elastomeric band 154a encircling the upper portion 150c and a lower elastomeric band 154b encircling the lower portion 150a, wherein the elastomeric bands may be, for example, composed of rubber material.

A cleaner stocking 152 is placed over the cleaner head body 150 and the open end thereof is secured to the cleaner head body at the bottom 150d of the cleaner head body via a cleaner stocking securement feature 156. A preferred cleaner stocking securement feature is an elastomeric O-ring 156a which presses the cleaner stocking into an annular groove 156b of the cleaner head body 150, and thereby traps the cleaner stocking onto the cleaner head body. The cleaner stocking 152 is composed of cloth which may be of any suitable material, man-made or natural, most preferably cotton, and has, as best seen at FIGS. 7A and 7B, a sheet of cloth 152a, having, on either side thereof, a dense multiplicity of substantially square-shaped and generally upstanding loops 152b. A preferred cleaner stocking 152, having the features described and shown at FIGS. 7A and 7B, is available as a part number LWTB0001 polish cloth from Contec, Inc. of Spartanburg, S.C. 29304 and sold under the trademark name THUNDERBUFF. It will be appreciated that the at least one elastomeric band 154 provides resiliency for the cleaner stocking 152 vis-a-vis the cleaner head body 150 and the inner side 106a of a mounted wheel 106, wherein the location (locations) of the at least one elastomeric band on the cleaner head body is (are) preselected to be at where cleaning of the wheel is desired to occur, as for example at the inner side 106a of the wheel adjacent the wheel disk 106d, as for example provided by the cleaner stocking at the upper elastomeric band 154a (see FIGS. 6 and 8C). Once the cleaner stocking 152 has become either too worn or too soiled for further use, it is easily replaced with a fresh cleaner stocking by simple release and re-application of the cleaner stocking securement feature 156.

Figure 5A:
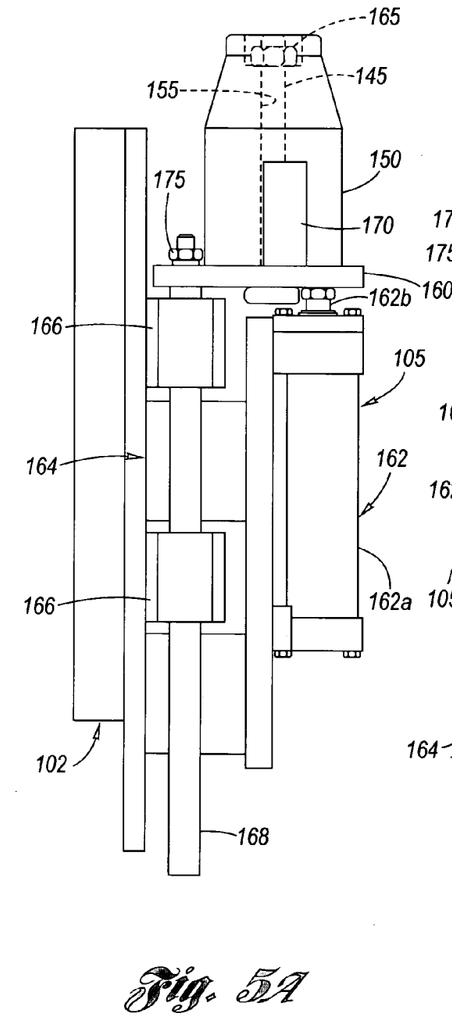
FIGS. 5A and 5B are, respectively, side and end views of a cleaner head assembly of the wheel cleaner apparatus of FIG. 1.

As can be understood from reference to FIG. 5A, the cleaner head body 150 is rotatably attached to a cleaner head base 160 via a shaft 145 affixed to the cleaner head base, wherein the shaft passes through a cleaner head body bore 155 and a threaded fastener 165 traps the cleaner head body on the shaft.

Figure 5B:
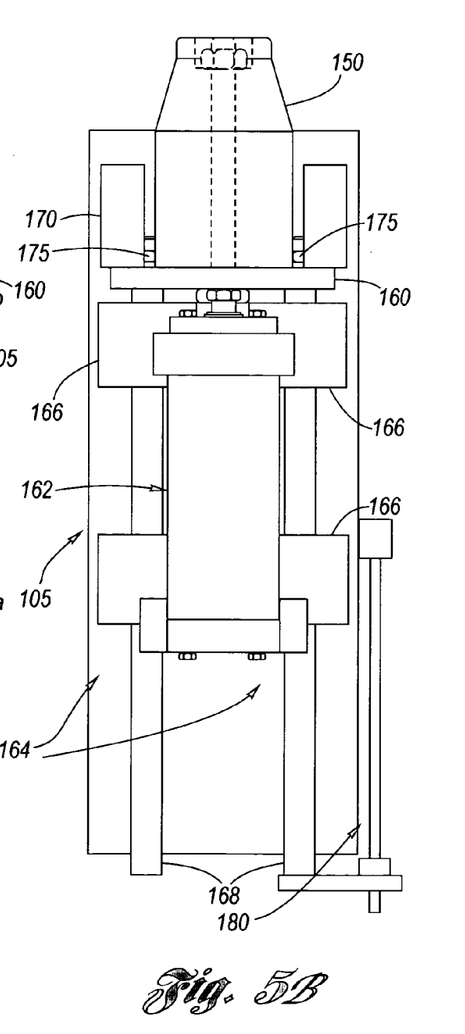

As additionally seen at FIG. 5B, a (preferably pneumatic) cleaner head actuator 162 has its cylinder 162a mounted to the main frame 102 in vertical orientation (perpendicular to the plane of the work table WT). The shaft 162b of the cleaner head actuator 162 is connected to the cleaner head base 160. In order to guide vertical translation of the cleaner head 110 in response to actuation of the cleaner head actuator 162 and to withstand the load produced by the horizontal translation of the rotation assembly actuator pressing the inner side of the mounted wheel against the cleaner head when at its deployed position, a pair of translation guides 164 are provided, each composed of a pair of bushings 166 mounted to the main frame 102 which respectively slidably receive a guide shaft 168. The guide shafts 168 are mounted by threadable connections 175 to the cleaner head base 160.

To provide alignment control of a mounted wheel as it rotates on the work table WT in response to rotation of the rotator 132 and rotation of the driven rollers 104d, a pair of inboard guide rollers 170 are rotatably mounted to the cleaner head base 160 on either side of the cleaner head 110 (see FIGS. 4 and 5B) which abut the inner side of the wheel, and an outboard roller 172 is rotatably mounted to the rotation assembly frame 130 (see FIGS. 2 and 4) which abuts the tread of the tire.

In order to ensure the height of the cleaner head 110 is correct and does not strike the disk 106d of the wheel 106w of the mounted wheel 106 when the cleaner head reaches its deployed position (see FIG. 8B), a linear transducer 180 is utilized (see FIG. 5B), which is attached to an end of one of the guide shafts, wherein magnets on the transducer shaft provide precise location information of the cleaner head as it moves via actuation of the cleaner head actuator 162. A preferred linear transducer 180 is a model BTL5-A/C/E/G_-M_-B/Z-S32/KA_Micropulse Linear Transducer with rod style analog output, available through Balluff, Inc. of Florence, Ky. 41042, and is sold under the trademark MICROPULSE. Information on wheel size for operation of the linear transducer 180 so that the cleaner head 110 does not strike the mounted wheel 106 is provided to the microprocessor 302 in advance of loading of the mounted wheel (see FIG. 11).

Referring now to FIGS. 8A through 8B operation of the wheel cleaner apparatus 100 will be detailed.

As shown at FIG. 8A, the driven rollers 104d are rotationally activated to receive a mounted wheel 106, wherein the wheel thereof lies such that the inner side 106a faces the rollers set. The driven rollers are then rotationally deactivated to position the mounted wheel at the work table WT.

As shown at FIG. 8B, the cleaner head actuator 162 is actuated which vertically translates the cleaner head 110 from its stored position to its deployed position so as to be within the inner side of the wheel without making contact therewith (inclusive of the inboard guide rollers 170, lest contact inadvertently flip or dislodge the mounted wheel), achieved by information derived from the linear transducer 180.

As shown at FIG. 8C, the rotation assembly actuator 138 is actuated, causing the rotation assembly 108 to horizontally translate toward the tire of the mounted wheel from its stored position to its deployed position, where during the rotator contacts the tire tread and then pushes the mounted wheel toward the cleaner head until the cleaner head touches the inner side of the wheel. Wheel size is accommodated based upon the rotation assembly translating to a particular deployed position determined by the cleaner head 110 abutting the inner side 106a of the wheel 106w and the rotator 132 abutting the tire tread 106r of the tire 106t under a predetermined applied pressure, per pneumatic pressure sensors 316 (see FIG. 11).

The driven rollers are again rotationally activated (see rotation direction R2 of FIG. 4) while simultaneously the rotator 132 commences rotation (see rotation direction R1 of FIG. 4) while in engagement with the tire tread, whereupon the mounted wheel commences to rotate (see rotation direction R3 of FIG. 4). During the rotation of the mounted wheel (as for example a little over one revolution), the cleaner head 110 is contactingly caused to rotate by the rotation of the inner side surface of the wheel, thereby contactingly cleaning the inner side surface of the wheel, particularly at the location of the at least one elastomeric band whereat adhesively applied balancing weights will be subsequently placed.

Next the rotation of the driven rollers and the rotator are stopped, the cleaner head is then vertically translated back to its stored position, and the rotation assembly is then horizontally translated back to its stored position. The rollers set is then activated again to exit the mounted wheel from the wheel cleaner apparatus for further operations (ie., wheel balancing, including the attachment of the adhesively attached balancing weights to the cleaned inner side wheel surface).

Referring now to FIG. 9, the aforementioned singulation of the mounted wheels on the supply side conveyance will be detailed by way of exemplification.

Stop pins Pa, Pb are provided which selectively abuttingly engage the mounted wheels 106 (individually distinguished by letters A through D) to singulate advancement thereof. A first stop pin Pa is intended to restrain a line of mounted wheels so that when the second stop pin Pb is retracted only one tire is advanced to the wheel cleaner apparatus 100. The mounted wheel singulation sequence is as follows.

Figure 9A:
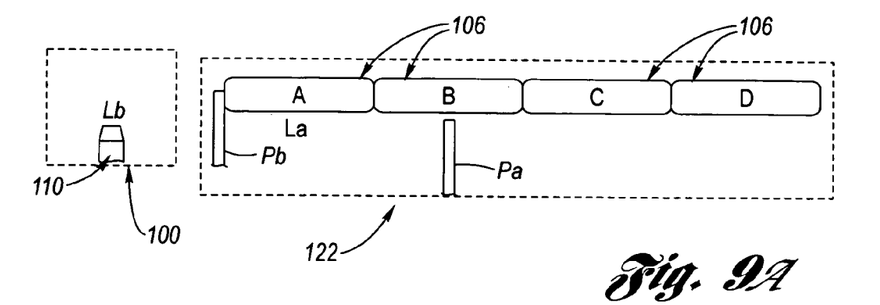
FIGS. 9A through 9D are a series of schematic depictions of mounted wheel singulation of the supply-side conveyance of FIG. 3.
Figure 9B:
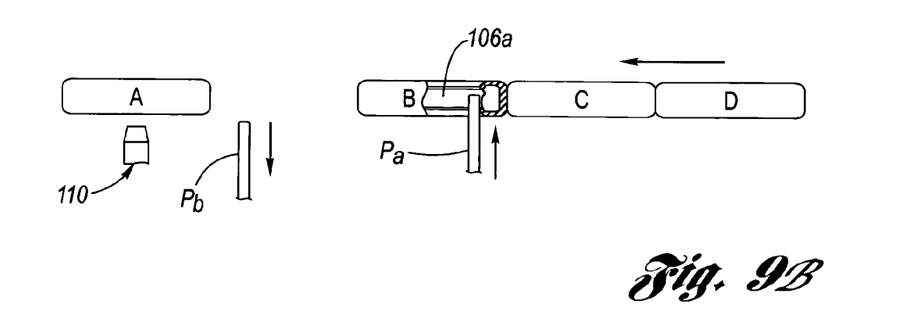
Figure 9C:
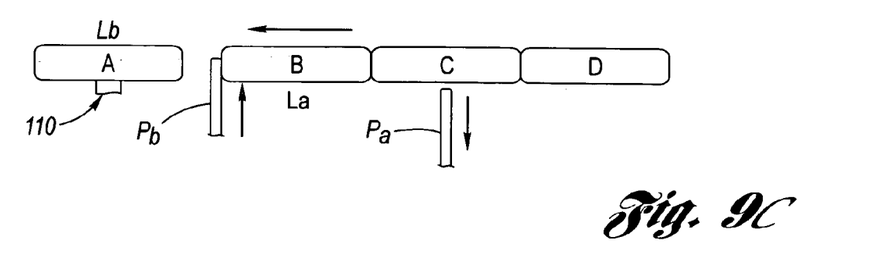
Figure 9D:
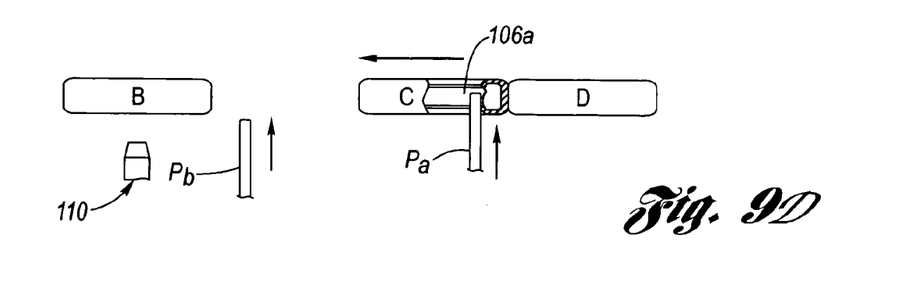

The first and second stop pins Pa, Pb move oppositely into respective raised and lowered positions, with initially the first stop pin Pa at the lowered position and the second stop pin Pb at the raised position, as shown in FIG. 9A. As shown at FIG. 9B, the first stop pin Pa is raised and the second stop pin Pb is lowered to: 1) allow mounted wheels B, C and D to advance toward location La by the inner side of the wheel of mounted wheel B abutting the first stop pin Pa, and 2) allow only mounted wheel A to advance to location Lb (into position over the cleaner head 110 on the rollers set). Subsequently, the first stop pin Pa is lowered and the second stop pin Pb is raised to allow mounted wheel B to advance to location La, as shown in FIG. 9C. After mounted wheel A has been cleaned at location Lb and advanced therefrom, the second stop pin Pb is lowered and the first stop pin Pa is raised to: 1) allow only mounted wheel B to advance to location Lb, and 2) allow mounted wheels C and D to advance toward location La by the inner side of the wheel of the mounted wheel C abutting the first stop pin Pa, as shown at FIG. 9D. Mounted wheel B is cleaned and then advanced out of the work table, whereupon the stop pins continue cycling as above recounted to thereby provide orderly advance of the mounted wheels in a singulated manner.

Figure 10:
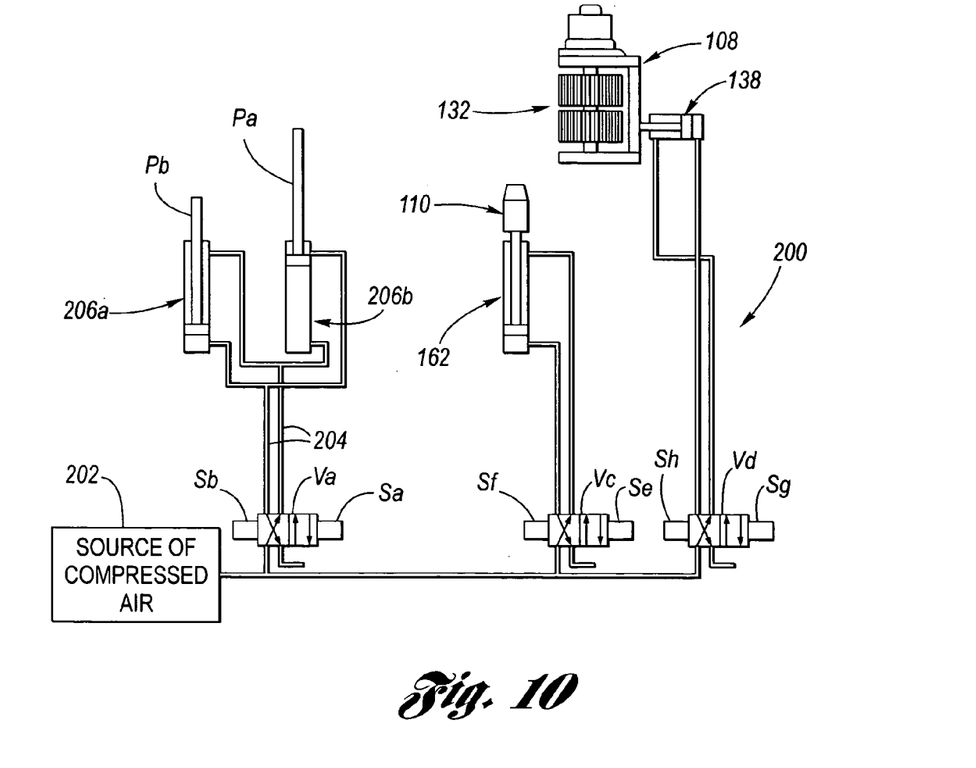
FIG. 10 is a pneumatic schematic for the wheel cleaner apparatus of FIG. 1.

Now turning to FIG. 10, the pneumatic circuit will be discussed. The pneumatic circuit 200 is connected to a source of compressed air 202 having conventional compressor, filter, pressure regulator and indicator components. Pneumatic hoses 204 supply the compressed air to the various constituents of the pneumatic circuit 200. A four-way pneumatic valve Va operated by solenoid Sa and solenoid Sb controls lowering and raising of the first and second stop pins Pa, Pb via pneumatic piston-cylinder actuators 206a, 206b connected respectively thereto and which are connected at preselected locations to the supply side conveyance. A four-way pneumatic valve Vc operated by solenoid Se and solenoid Sf controls actuation of the cleaner head actuator 162. A four-way pneumatic valve Vd operated by solenoid Sg and solenoid Sh controls actuation of the rotation assembly actuator 138.

Figure 11:
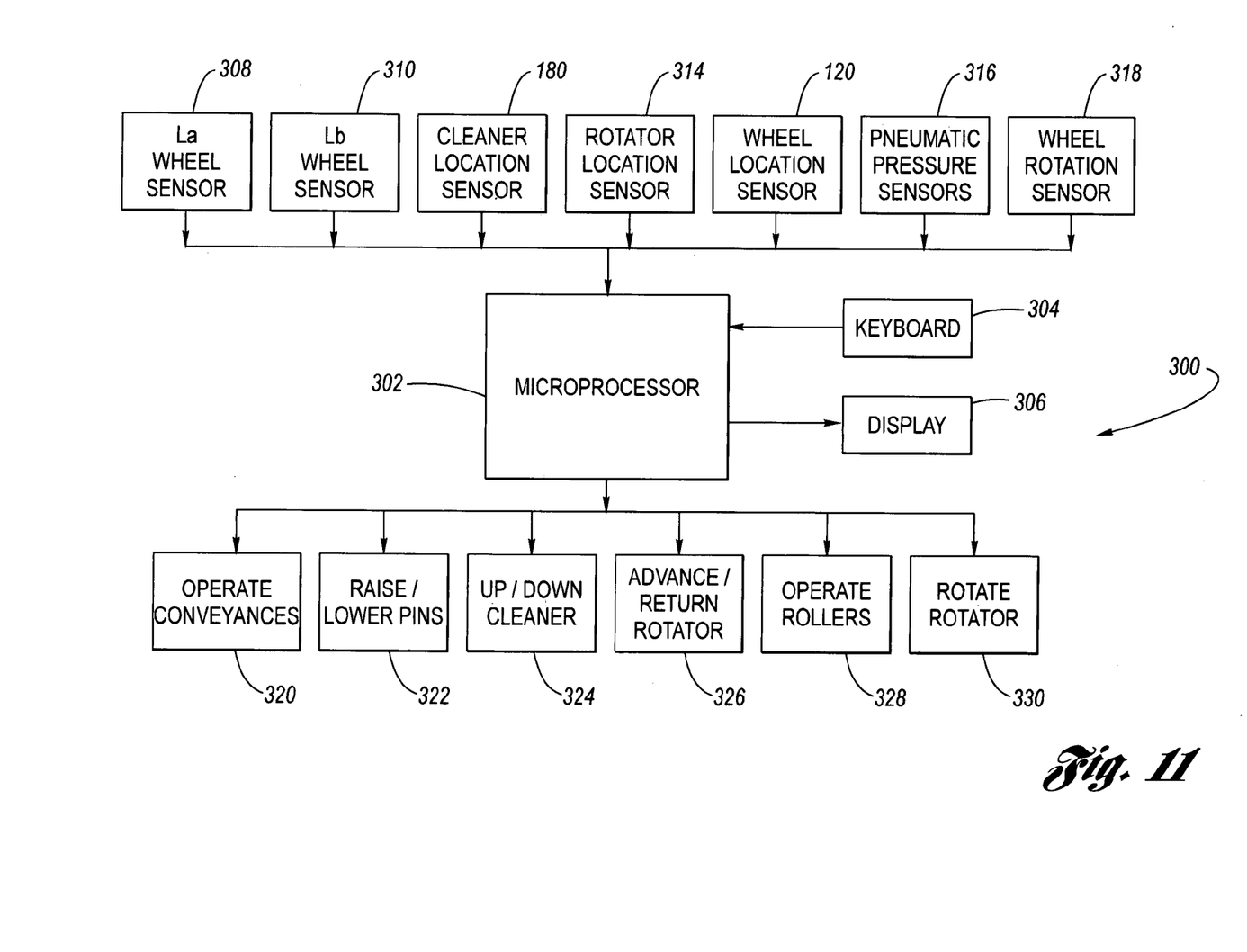
FIG. 11 is a logic schematic for the wheel cleaner apparatus of FIG. 1.

Referring now to FIG. 11, a schematic electrical diagram 300 is depicted, wherein control of operation of the wheel cleaner apparatus 100 is provided by an electronic processor, such as a microprocessor 302 of the type used in microcomputers and controller devices.

The microprocessor 302 is provided with suitable interface electronics and is further provided with appropriate read only memory (ROM) and/or is provided with software programmable random access memory (RAM) such as stored in the data storage media of a disk drive or semiconductor chip. In this regard, it is preferred to include a keyboard 304 and a display 306 to thereby allow programming adjustment and display of programming information.

The microprocessor 302 is interfaced with a plurality of sensors which indicate the status of particular operations of the wheel cleaner apparatus 100. For example, a sensor 308 senses if a mounted wheel is located at location La; a sensor 310 senses if a mounted wheel is located at location Lb; the aforementioned linear transducer (sensor) 180 senses the translational position of the cleaner head 110; a sensor 314 senses the translational position of the rotation assembly; the aforementioned sensor 120 senses the location of a mounted wheel on the rollers set 104; pneumatic pressure sensors 316 sense the air pressure in the actuators; and a sensor 318 senses the rotation of the mounted wheel. Yet other sensors can be included. The sensors are of conventional nature, being appropriate to the quantity intended to be sensed. For example, the sensors may be photoelectrically, electrically, or mechanically based, or a combination thereof.

The sensed data is interpreted by the microprocessor 302 using the aforementioned software. The result is output to the various components of the wheel cleaner apparatus 100. For example, the microprocessor 302 will output an operate conveyances signal 320 to the supply-side and delivery-side conveyances, output raise/lower stop pins signals 322 to solenoids Sa, Sb, output a translate cleaner head signal to the cleaner head actuator solenoids Sc, Sd, output a translate cleaner head signal 324 to solenoids Sf, Se, output a translate rotation assembly signal 326 to solenoids Sh, Sg, output an operate rollers signal 328 the driven rollers motor, and output a rotate rotator signal 330 to the rotator drive motor. Other output signals can be provided.

Figure 12:
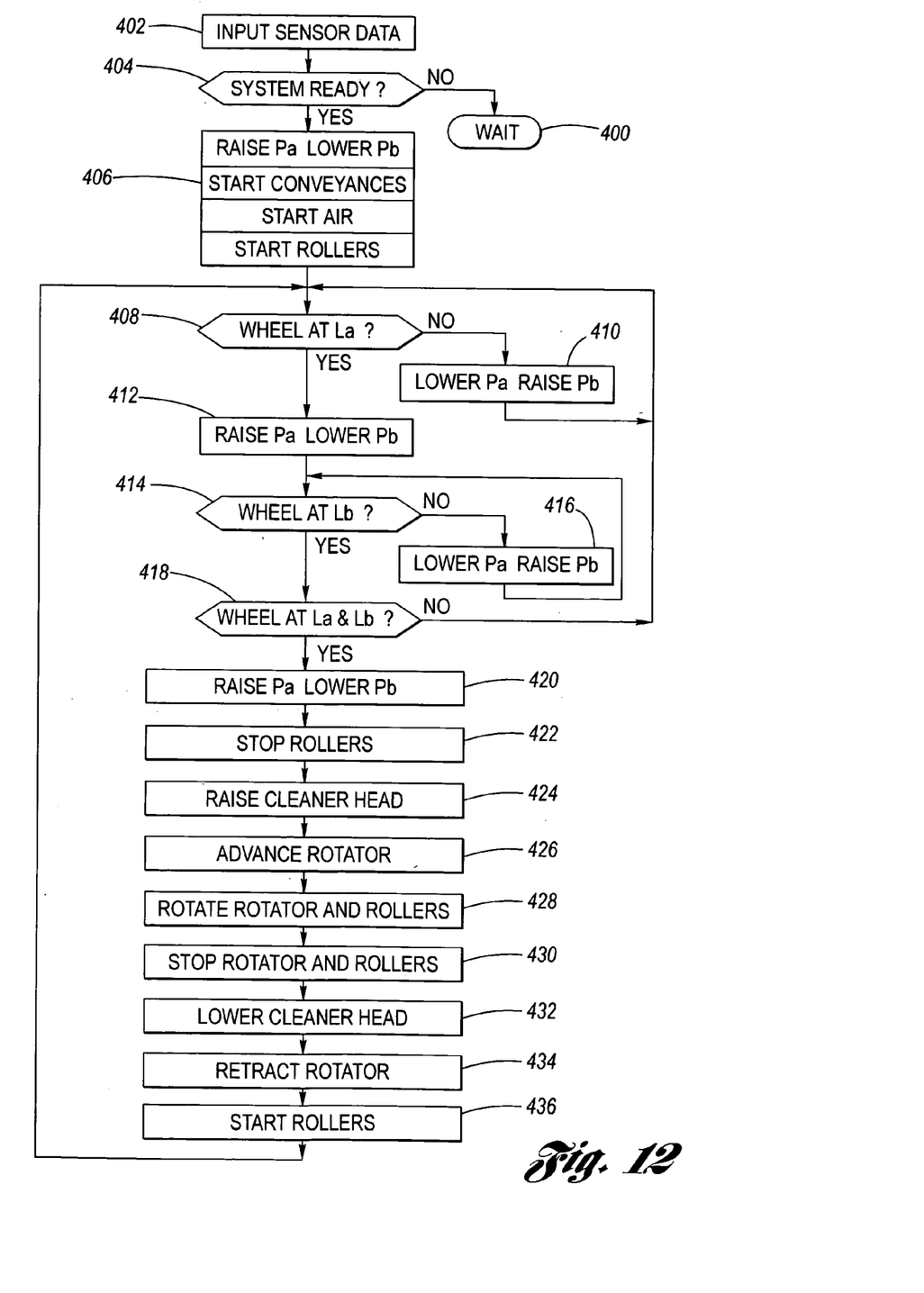
FIG. 12 is an operational flow chart of the wheel cleaner apparatus of FIG. 1.

Referring now to FIG. 12 a schematic flow chart 400 for carrying out the electronic circuit of FIG. 11 will be described.

At block 402 sense information from the sensors is provided to the microprocessor 302, including, for example, wheel size of the forthcoming mounted wheel. The microprocessor interprets the sensed data based upon a software instructional program at decision block 404, and inquires whether the wheel cleaner apparatus 100 is ready for operation. If not, it waits, otherwise, the microprocessor, at execution block 406, sets the initial position of the stop pins Pa, Pb, activates rotation of the driven rollers 104d by actuating the driven rollers electric motor and initiates the supply of compressed air.

Next, at decision block 408, the microprocessor inquires whether a mounted wheel is located at location La. If not, the microprocessor at execution block 410 sends a signal to raise stop pin Pb and lower stop pin Pa and then re-inquires at decision block 408 whether a mounted wheel has advanced to location La; if a tire is detected at location La the microprocessor at execution block 412 sends a signal to raise stop pin Pa and lower stop pin Pb. The microprocessor next inquires at decision block 414 whether a mounted wheel is located at location Lb. If not, the microprocessor at execution block 416 sends a signal to raise stop pin Pa and lower stop pin Pb and then re-inquires at decision block 414 whether a mounted wheel has advanced to location Lb; if a mounted wheel is detected at location Lb, the microprocessor at execution block 418 sends a signal to lower stop pin Pa and raise stop pin Pb. The microprocessor then inquires at decision block 420 whether a mounted wheel is present at each of locations La and Lb. If not, the microprocessor returns to decision block 408 whereupon the mounted wheel advance sequence is revisited. If no mounted wheel advances after a preset time, the microprocessor then sends a standby signal to Block 412 to thereby place the wheel cleaner apparatus in a wait state.

As a mounted wheel passes on the rollers set and the sensor 120 senses its presence, the microprocessor sends a signal, at execution block 422, stopping rotation of the driven rollers, whereupon the mounted wheel coasts into position over the cleaner head on the work table WT. At execution block 424 the microprocessor sends a signal to translate the cleaner head to its deployed position based upon signal feedback from the linear transducer. At execution block 426 the microprocessor sends a signal to translate the rotation assembly to its deployed position. At execution block 428, the microprocessor sends signals to simultaneously begin rotation of the driven rollers and rotation of the rotator. The cleaner head rotates due to contact with the inner side of the rotating wheel, and contactingly cleans the inner side surface of the wheel, while the microprocessor monitors the amount of rotation of the mounted wheel, as for example by monitoring rotation of the rotator. At execution block 430 the microprocessor has determined that at least one revolution (preferably about one and one quarter) of the mounted wheel has transpired and thereupon sends a signals to simultaneously stop rotation of the driven rollers and rotation of the rotator. At execution block 432 the microprocessor sends a signal to translationally retract the cleaner head back to its stored position. At execution block 434 the microprocessor sends a signal to translationally retract the rotation assembly back to its stored position. Finally, at execution block 436 the microprocessor sends a signal to start again rotation of the driven rollers to cause exiting of the now cleaned mounted wheel out of the wheel cleaner apparatus, whereupon the microprocessor returns to decision block 408.

It is to be understood that the term "tread" as used with reference herein means the road bearing surface of a tire and includes tires with or without an actual tread design (ie., slicks).

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A wheel cleaner apparatus for cleaning an inner side of a motor vehicle wheel, the wheel having an inflated tire mounted thereto, the combination of the wheel and the tire comprising a mounted wheel, said apparatus comprising:
    a main frame;
    a rollers set rotatably connected to said main frame, said rollers set defining a plane;
    a rotation assembly translatably connected to said main frame, said rotation assembly comprising:
        a rotator; and
        a rotator drive motor connected to said rotator;
    a first actuator connected to said main frame and said rotation assembly, wherein selective actuation of said first actuator translates said rotation assembly parallel to said plane between a stored position and a deployed position;
    a cleaner head assembly translatably connected to said main frame, said cleaner head assembly comprising a cleaner head; and
    a second actuator connected to said main frame and said cleaner head, wherein selective actuation of said second actuator translates said cleaner head perpendicular to said plane between a stored position and a deployed position;
    wherein when a mounted wheel lies upon said roller set:
        said second actuator translates said cleaner head from its stored position to its deployed position whereat said cleaner head is situated within an inner side of a wheel of the mounted wheel;
        said first actuator translates said rotation assembly from its stored position to its deployed position whereat said rotator presses against a tread of the tire, and the mounted wheel is positioned on said roller set whereat said cleaner head abuts the inner surface of the wheel; and
        said rotator rotates, causing the mounted wheel to rotate and the cleaner head to clean the inner side surface of the wheel.

2. The apparatus of claim 1, wherein said cleaner head comprises:
    a cleaner head body rotatably connected to said second actuator, said cleaner head body having a bottom; and
    a cleaner stocking covering said cleaner head body.

3. The apparatus of claim 2, wherein said cleaner head further comprises:
    said cleaner head body comprising:
        a first cylindrical portion adjoining said bottom of said cleaner head body;
        a reduced diameter second cylindrical portion adjoining a top of said cleaner head body; and
        a frustonical portion situated between said first and second cylindrical portions; and
    said cleaner stocking comprising:
        a sheet of cloth; and
        a multiplicity of substantially square shaped and generally upstanding loops of the cloth at each side of said sheet of cloth.

4. The apparatus of claim 3, wherein said cleaner head further comprises:

a cleaner stocking securement feature adjacent said bottom; and
at least one elastomeric band encircling said cleaner head body; and
wherein said cleaner stocking is located covering said cleaner head body and said at least one elastomeric band, and wherein said cleaner stocking securement feature trappingly encircles said cleaner stocking so as to secure, in a selectively removable manner, said cleaner stocking onto said cleaner head body.

5. The apparatus of claim 2, wherein said roller set comprises:
    a plurality of driven rollers;
    a plurality of non-driven rollers, wherein said plurality of driven and non-driven rollers is configured to provide an opening through which said cleaner head translates when moving between its stored and deployed positions; and
    a driven rollers motor connected to said driven rollers;
    wherein actuation of said driven rollers motor causes rotation of said driven rollers, selective rotation of said driven rollers provides selective movement of the mounted wheel with respect to said main frame parallel to said plane, and wherein rotation of said driven rollers in conjunction with rotation of said rotator results in rotation of the mounted wheel.

6. The apparatus of claim 5, wherein said rotator comprises at least one toothed wheel.

7. The apparatus of claim 6, wherein said cleaner head assembly further comprises:
    a base connected to said bottom of said cleaner head body and connected to said second actuator;
    at least one translation guide comprising:
        at least one bushing connected to said main frame; and
        a shaft slidably received in and guided by said at least one bushing, said shaft being connected to said base.

8. The apparatus of claim 7, further comprising:
    a plurality of sensors; and
    an electronic controller connected to said sensors, said first and second actuators, said driven rollers motor and said rotator drive motor;
    wherein selective programming of said electronic controller defines said deployed positions, respectively, of said rotation assembly and said cleaner head, and defines actuation of said driven rollers motor and said rotator drive motor.

9. The apparatus of claim 8, wherein said cleaner head further comprises:
    said cleaner head body comprising:
        a first cylindrical portion adjoining said bottom of said cleaner head body;
        a reduced diameter second cylindrical portion adjoining a top of said cleaner head body; and
        a frustonical portion situated between said first and second cylindrical portions; and
    said cleaner stocking comprising:
        a sheet of cloth; and
        a multiplicity of substantially square shaped and generally upstanding loops of the cloth at each side of said sheet of cloth.

10. The apparatus of claim 9, wherein said cleaner head further comprises:
    a cleaner stocking securement feature adjacent said bottom; and
    at least one elastomeric band encircling said cleaner head body; and wherein said cleaner stocking is located covering said cleaner head body and said at least one elastomeric band, and wherein said cleaner stocking securement feature trappingly encircles said cleaner stocking so as to secure, in a selectively removable manner, said cleaner stocking onto said cleaner head body.

11. A wheel cleaner apparatus for cleaning an inner side of a motor vehicle wheel, the wheel having an inflated tire mounted thereto, the combination of the wheel and the tire comprising a mounted wheel, said apparatus comprising:
 a main frame;
 a rollers set rotatably connected to said main frame, said rollers set defining a plane;
 a rotation assembly translatably connected to said main frame, said rotation assembly comprising:
  a rotator; and
  a rotator drive motor connected to said rotator;
 a first actuator connected to said main frame and said rotation assembly, wherein selective actuation of said first actuator translates said rotation assembly parallel to said plane between a stored position and a deployed position;
 a cleaner head assembly translatably connected to said main frame, said cleaner head assembly comprising a cleaner head, said cleaner head comprising:
  a cleaner head body having a bottom; and
  a cleaner stocking covering said cleaner head body, said cleaner stocking comprising:
   a sheet of cloth; and
   a multiplicity of substantially square shaped and generally upstanding loops of the cloth at each side of said sheet of cloth; and
 a second actuator connected to said main frame and rotatably to said cleaner head, wherein selective actuation of said second actuator translates said cleaner head perpendicular to said plane between a stored position and a deployed position;
 wherein when a mounted wheel lies upon said roller set:
  said second actuator translates said cleaner head from its stored position to its deployed position whereat said cleaner head is situated within an inner side of a wheel of the mounted wheel;
  said first actuator translates said rotation assembly from its stored position to its deployed position whereat said rotator presses against a tread of the tire, and the mounted wheel is positioned on said roller set whereat said cleaner head abuts the inner surface of the wheel; and
  said rotator rotates, causing the mounted wheel to rotate and the cleaner head to clean the inner side surface of the wheel.

12. The apparatus of claim 11, wherein said cleaner head body further comprises:
 a first cylindrical portion adjoining said bottom of said cleaner head body;
 a reduced diameter second cylindrical portion adjoining a top of said cleaner head body; and
 a frustonical portion situated between said first and second cylindrical portions.

13. The apparatus of claim 12, wherein said cleaner head further comprises:
 a cleaner stocking securement feature adjacent said bottom; and
 at least one elastomeric band encircling said cleaner head body; and
 wherein said cleaner stocking is located covering said cleaner head body and said at least one elastomeric band, and wherein said cleaner stocking securement feature trappingly encircles said cleaner stocking so as to secure, in a selectively removable manner, said cleaner stocking onto said cleaner head body.

14. The apparatus of claim 11, wherein said roller set comprises:
 a plurality of driven rollers;
 a plurality of non-driven rollers, wherein said plurality of driven and non-driven rollers is configured to provide an opening through which said cleaner head translates when moving between its stored and deployed positions; and
 a driven rollers motor connected to said driven rollers;
 wherein actuation of said driven rollers motor causes rotation of said driven rollers, selective rotation of said driven rollers provides selective movement of the mounted wheel with respect to said main frame parallel to said plane, and wherein rotation of said driven rollers in conjunction with rotation of said rotator results in rotation of the mounted wheel.

15. The apparatus of claim 14, wherein said rotator comprises at least one toothed wheel.

16. The apparatus of claim 15, wherein said cleaner head assembly further comprises:
 a base connected to said bottom of said cleaner head body and connected to said second actuator;
 at least one translation guide comprising:
 at least one bushing connected to said main frame; and
 a shaft slidably received in and guided by said at least one bushing, said shaft being connected to said base.

17. The apparatus of claim 16, further comprising:
 a plurality of sensors; and
 an electronic controller connected to said sensors, said first and second actuators, said driven rollers motor and said rotator drive motor;
 wherein selective programming of said electronic controller defines said deployed positions, respectively, of said rotation assembly and said cleaner head, and defines actuation of said driven rollers motor and said rotator drive motor.

18. The apparatus of claim 17, wherein said cleaner head body further comprises:
 a first cylindrical portion adjoining said bottom of said cleaner head body;
 a reduced diameter second cylindrical portion adjoining a top of said cleaner head body; and
 a frustonical portion situated between said first and second cylindrical portions.

19. The apparatus of claim 18, wherein said cleaner head further comprises:
 a cleaner stocking securement feature adjacent said bottom; and
 at least one elastomeric band encircling said cleaner head body; and
 wherein said cleaner stocking is located covering said cleaner head body and said at least one elastomeric band, and wherein said cleaner stocking securement feature trappingly encircles said cleaner stocking so as to secure, in a selectively removable manner, said cleaner stocking onto said cleaner head body.

20. A wheel cleaner apparatus for cleaning an inner side of a motor vehicle wheel, the wheel having an inflated tire mounted thereto, the combination of the wheel and the tire comprising a mounted wheel, said apparatus comprising:
 a main frame;
 a rollers set rotatably connected to said main frame, said rollers set defining a plane;

a rotation assembly translatably connected to said main frame, said rotation assembly comprising:
  a rotator; and
  a rotator drive motor connected to said rotator;
a first actuator connected to said main frame and said rotation assembly, wherein selective actuation of said first actuator translates said rotation assembly parallel to said plane between a stored position and a deployed position;
a cleaner head assembly translatably connected to said main frame, said cleaner head assembly comprising a cleaner head, said cleaner head comprising:
  a cleaner head body having a bottom;
  at least on elastomeric band encircling said cleaner head body; and
  a cleaner stocking covering said cleaner head body and said at least one elastomeric band, said cleaner stocking comprising:
    a sheet of cotton cloth; and
    a multiplicity of substantially square shaped and generally upstanding loops of the cloth at each side of said sheet of cloth; and
  a cleaner stocking securement feature adjacent said bottom for releasably securing said cleaner stocking to said cleaner head body;
a second actuator connected to said main frame and rotatably to said cleaner head, wherein selective actuation of said second actuator translates said cleaner head perpendicular to said plane between a stored position and a deployed position;
a plurality of sensors; and
an electronic controller connected to said sensors, said first and second actuators and said rotator drive motor;
wherein selective programming of said electronic controller defines said deployed positions, respectively, of said rotation assembly and said cleaner head, and defines actuation of said rotator drive motor; and
wherein when a mounted wheel lies upon said roller set:
  said second actuator translates said cleaner head from its stored position to its deployed position whereat said cleaner head is situated within an inner side of a wheel of the mounted wheel;
  said first actuator translates said rotation assembly from its stored position to its deployed position whereat said rotator presses against a tread of the tire, and the mounted wheel is positioned on said roller set whereat said cleaner head abuts the inner surface of the wheel; and
  said rotator rotates, causing the mounted wheel to rotate and the cleaner head to clean the inner side surface of the wheel.

* * * * *